United States Patent
Hsu

(10) Patent No.: US 8,612,988 B2
(45) Date of Patent: Dec. 17, 2013

(54) METHOD FOR MONITORING SYSTEM RESOURCES AND ASSOCIATED ELECTRONIC DEVICE

(75) Inventor: Shu Hao Hsu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 464 days.

(21) Appl. No.: 12/752,358

(22) Filed: Apr. 1, 2010

(65) Prior Publication Data

US 2010/0269117 A1    Oct. 21, 2010

(30) Foreign Application Priority Data

Apr. 17, 2009    (TW) .............................. 98112900 A

(51) Int. Cl.
*G06F 9/50*    (2006.01)
*G05D 1/00*    (2006.01)

(52) U.S. Cl.
USPC ................ 718/104; 718/107; 718/108; 701/1

(58) Field of Classification Search
None
See application file for complete search history.

(56) References Cited

U.S. PATENT DOCUMENTS

2010/0153963 A1*   6/2010   Kakarlamudi et al. ....... 718/105

* cited by examiner

*Primary Examiner* — Qing Wu
(74) *Attorney, Agent, or Firm* — Edell, Shapiro & Finnan, LLC

(57) ABSTRACT

A method, for monitoring resources of a system for performing a first task and a second task, includes calculating a first completion count of the first task; calculating a second completion count of the second task; and determining whether the resources of the system are exhausted according to the first completion count and the second completion count.

17 Claims, 7 Drawing Sheets

METHOD FOR MONITORING SYSTEM RESOURCES AND ASSOCIATED ELECTRONIC DEVICE

CROSS REFERENCE TO RELATED PATENT APPLICATION

This patent application is based on Taiwan, R.O.C. patent application No. 098112900 filed on Apr. 17, 2009.

FIELD OF THE INVENTION

The present invention relates to a method for monitoring system resources and an associated electronic device, and more particularly, to a method and an electronic device capable of monitoring system resources by utilizing counts of performed tasks with different priorities.

BACKGROUND OF THE INVENTION

In an information system, the system is required to simultaneously perform a plurality of tasks, i.e., it is configured to perform multitasking. In this situation, each of the tasks is divided into various numbers of small task intervals. When a task interval of one from the tasks is performed, the task actively or passively releases system resources, such that other tasks can be performed. However, some system resources may be perpetually occupied by a particular task due to certain factors (e.g., when a program enters an infinite loop) to forcibly suspend the entire multitasking process or even crash the system. Such a phenomenon is referred to as "system resource exhaustion."

Described below are three prior art methods for detecting whether system resources are exhausted. In a first method, a task with a lowest priority is first found, and then it is determined that system resources are exhausted when the lowest-priority task is not at all performed within a predetermined time period. Although being rather simple, the first method has the disadvantage of being unable to determine which task caused system resource exhaustion. In a second method, a logic analyzer is coupled to general purpose input/output (GPIO) pins of the system to identify a task that caused system resource exhaustion by monitoring voltage changes of the GPIO pins when tasks are performed. However, since there are multiple GPIO pins in a system, it is rather complicated to couple the GPIO pins to the logic analyzer. In a third method, a software program is used for monitoring performance of tasks when the tasks are performed to identify a task that occupies the system resources. For example, an operating system (OS) is modified to record information of each task switch. However, a disadvantage of the third method is that extra loading is added to the OS from executing additional tasks, and thus overall efficiency of the system is reduced.

SUMMARY OF THE INVENTION

With respect to the foregoing problem, one object of the present invention is to provide a method and an electronic device capable of monitoring whether resources of a system are exhausted by implementing counts of performed tasks with different priorities.

In order to achieve the foregoing object, according to an embodiment of the present invention, a method for monitoring resources of a system which performs a first task and a second task is provided. The method comprises calculating a first completion count of the first task; calculating a second completion count of the second task; and determining whether the resources of the system are exhausted according to the first completion count and the second completion count.

According to another embodiment of the present invention, a method for monitoring resources of a system which performs a first task and a second task is provided. The method comprises calculating a first completion count of the first task within a predetermined time period; counting a second completion time period within the predetermined time period; and determining whether the resources of the system are exhausted according to the first completion count and the second completion count.

According to yet another embodiment of the present invention, an electronic device, capable of monitoring system resources, comprises a first function module for performing a first task; and a second function module, coupled to the first function module, for performing a second task; wherein, the first function module determines whether the system resources of the electronic device are exhausted according to a first completion count of the first task and a second completion count of the second task.

Through the tasks that monitor one another, a method and an electronic device, capable of monitoring system resources, provided by the present invention, need not connect to external devices for monitoring performances of the tasks, so that complicated hardware connections are eliminated while also leaving resources of an OS unoccupied to maintain original efficiencies of the tasks. Since a certain priority relationship or a cause-and-effect relationship exists between the tasks, a task that exhausts the system resources may be identified through merely monitoring a task with a lower priority by a task with a higher priority.

DETAILED DESCRIPTION OF THE PREFERRED EMBODIMENT

Figure 1:
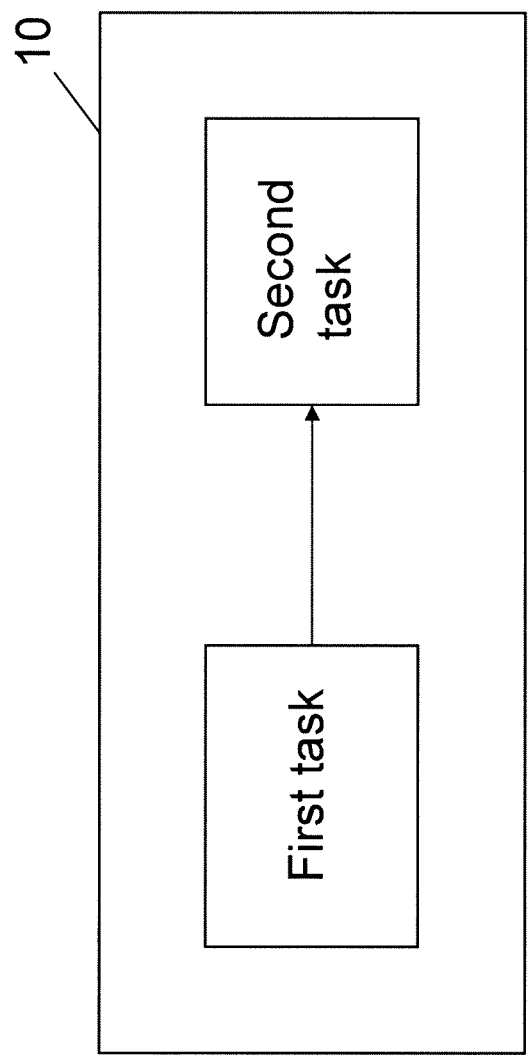
FIG. 1 is a schematic diagram of a method for monitoring resources of a system in accordance with a first embodiment of the present invention.
Figure 2:
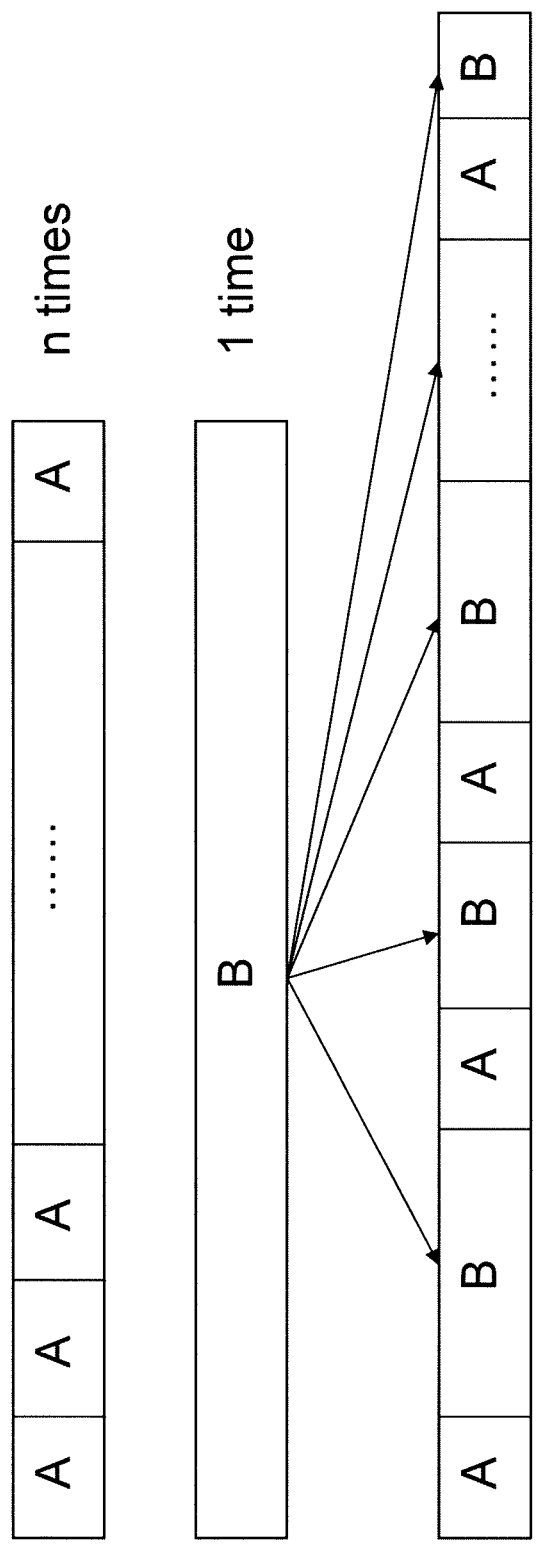
FIG. 2 is a schematic diagram of a performance relationship between two different tasks in a method for monitoring resources of a system in accordance with an embodiment of the present invention.

FIG. 1 shows a schematic diagram of a method for monitoring resources of a system in accordance with a first embodiment of the present invention. A system 10 simultaneously performs a first task and a second task, between which a correlation exists. For example, when a completion count of the first task achieves a first predetermined value, a completion count of the second task needs to achieve a second predetermined value, and such correlation is determined according to a design of the system 10. Therefore, the degree of completion of the two tasks is obtained by calculating the completion count of the first task and the completion count of the second task. When the completion count of the first task achieves the first predetermined value but the completion count of the second task does not achieve the second predetermined value, it can be deduced that resources of the system are exhausted since the completion count of the second task did not achieve its predetermined value. For example, suppose that the first predetermined value is n and the second predetermined value is 1, where n is an integer greater than or equal to 1. Referring to FIG. 2, when a first task A is performed n times, in theory, a second task B needs to be performed once. In practice, when the system performs multitasking, the first task A and the second task B are alternately performed, i.e., the second task B is performed during interval gaps of the first task A. Suppose that the first task A has a higher priority than that of the second task B. When the system 10 is exhausted due to errors in the second task B, the system 10 still performs the first task A as precedence during a real-time operating system (RTOS) context switch since the priority of the first task A is higher than that of the second task B. That is, when the completion count of the first task A achieves the first predetermined value n, but the completion count of the second task B fails to achieve the second predetermined value 1 because the system 10 is exhausted, it is determined that resources of the system 10 are exhausted.

Figure 3:
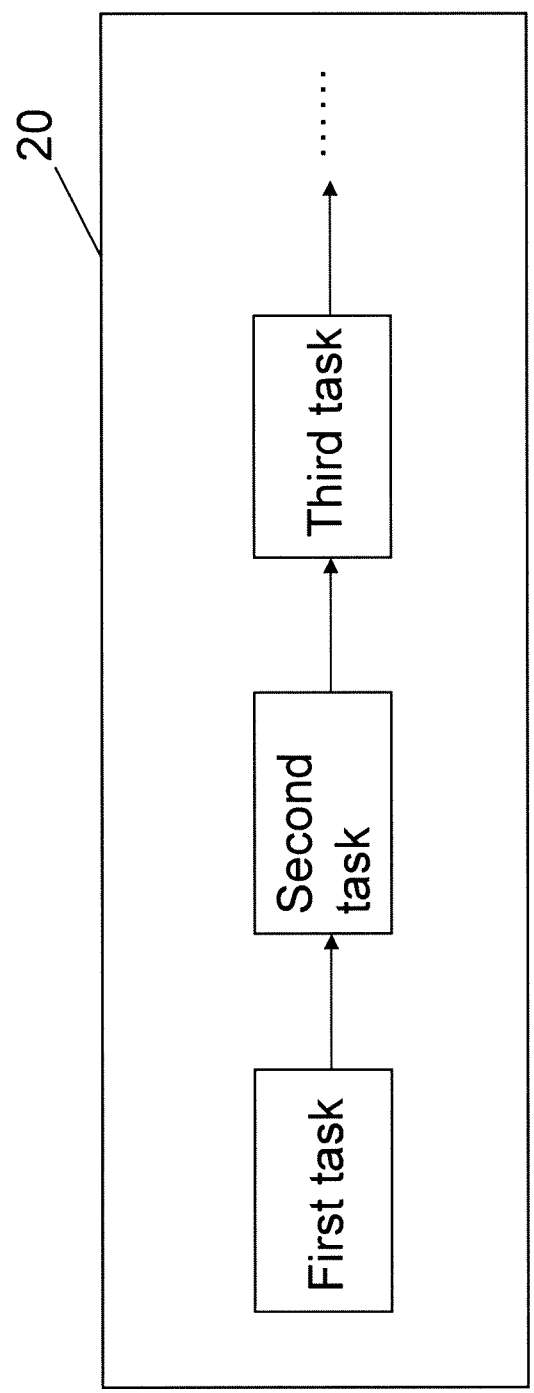
FIG. 3 is a schematic diagram of a method for monitoring resources of a system in accordance with a second embodiment of the present invention.

FIG. 3 shows a schematic diagram of a method for monitoring resources of a system in accordance with a second embodiment. When a system 20 performs multitasking on a plurality of tasks, the tasks are serially ordered according to priorities of the tasks, and a task with a higher priority monitors a task with a lower priority. For example, when a priority of a first task is higher than that of a second task, and the priority of the second task is higher than that of a third task, according to the method in the first embodiment, the system 20 determines whether resources of the system 20 are exhausted by the second task according to corresponding completion counts of the first task and the second task; likewise, the system 20 determines whether the resources of the system 20 are exhausted by the third task according to corresponding completion counts of the second task and the third task. Accordingly, the system 20 can monitor all tasks it performs to identify a task that causes exhaustion of the system 20.

Figure 4:
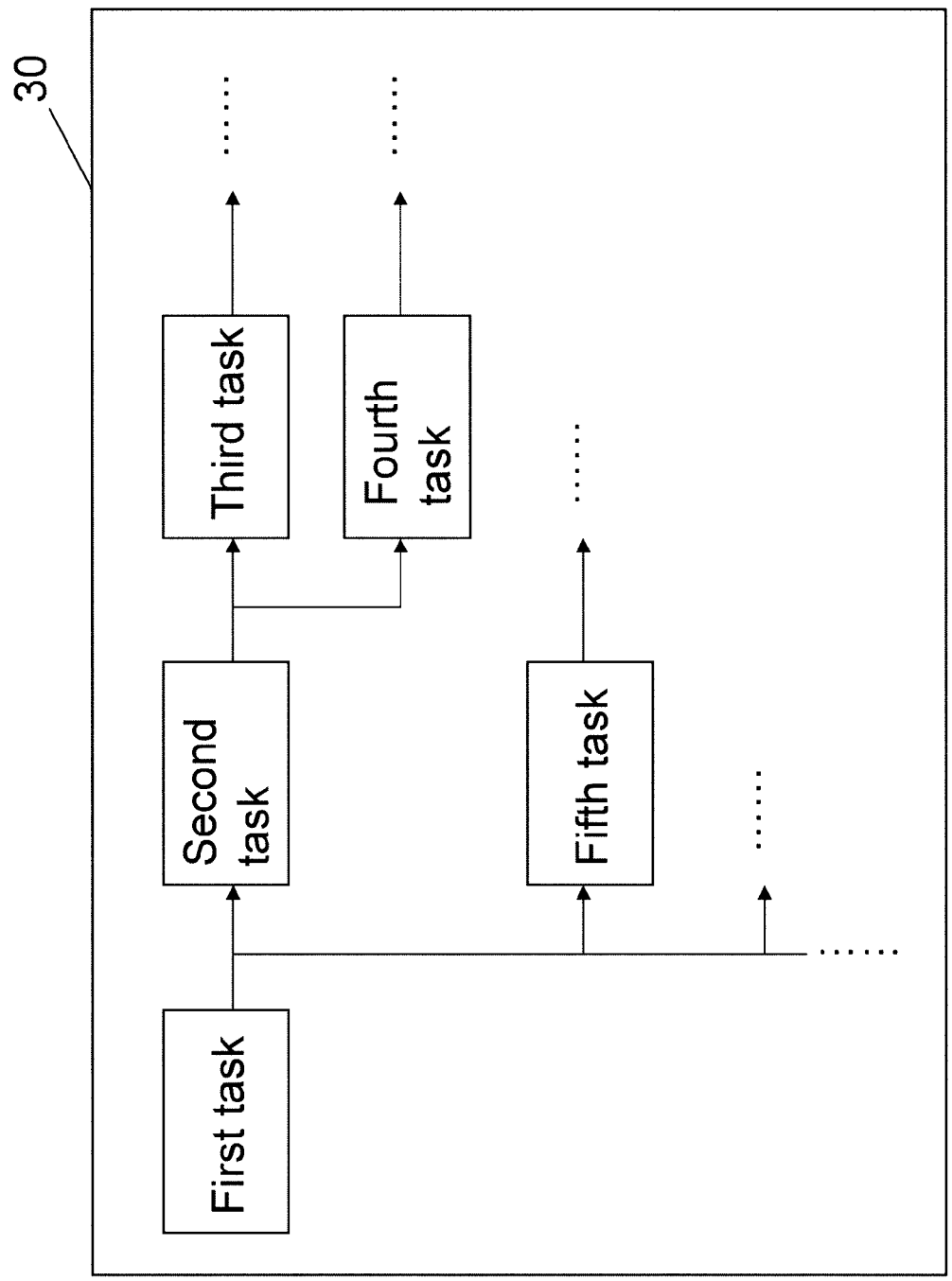
FIG. 4 is a schematic diagram of a method for monitoring resources of a system in accordance with a third embodiment of the present invention.

Depending on the complexity of a system, tasks being performed by the system may not be ideally represented via a simple serial relationship as stated above. FIG. 4 shows a schematic diagram of a method for monitoring resources of a system in accordance with a third embodiment of the present invention. A system 30 performs multitasking on a plurality of tasks comprising complicated relationships between priorities of the plurality of tasks. The relationships are represented by a serial relationship associated with a parallel relationship. The serial relationship represents that a task with a higher priority is performed before a task with a lower priority, i.e., a precedent task monitors an antecedent task according to the serial relationship. The parallel relationship represents an equal priority of two tasks or independence of two tasks, and in such situation, the two tasks are simultaneously monitored by a same precedent task with a higher priority; for example, a third task and a fourth task are simultaneously monitored by the second task, and the second task and the fifth task are simultaneously monitored by the first task.

The foregoing embodiments can be modified and applied, e.g., by introducing a frequency component. Specifically, a predetermined time is defined, a first completion count of the first task is calculated during the predetermined time and a second completion count of the second task is calculated during the predetermined time, and it is determined that whether resources of the system are exhausted according to the first completion count and the second completion count, i.e., it is determined whether the resources of the system are exhausted according to a proportion relationship between completion frequencies of the first task and the second task. For example, suppose that a satellite positioning device detects a parameter of a satellite signal every 0.1 second (i.e., the first task), and a position and a speed of the satellite positioning device is calculated every one second (i.e., the second task). Accordingly, one second is the predetermined time, during which the first task is performed ten times and the second task is performed once. Therefore, when the first task is performed ten times but the second task is performed less than once, it is determined that the resources of the system are exhausted.

Figure 5:
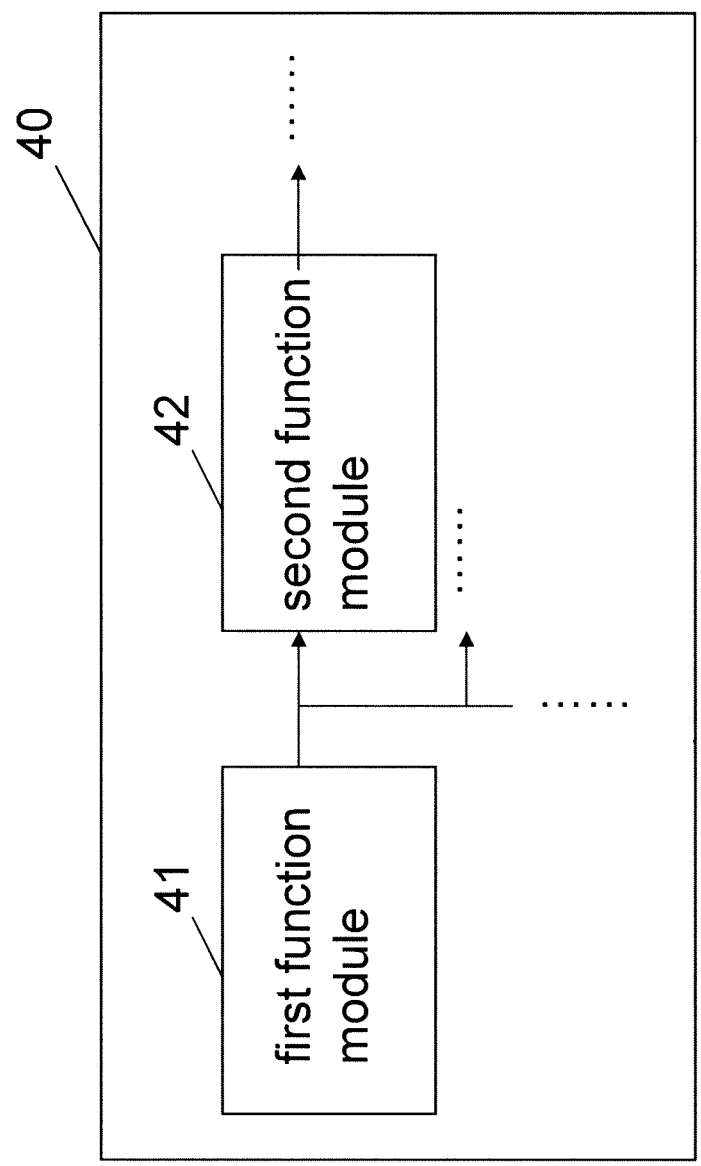
FIG. 5 is a block diagram of an electronic device capable of monitoring system resources in accordance with an embodiment of the present invention.

FIG. 5 shows a block diagram of an electronic device 40 capable of monitoring resources of a system in accordance with an embodiment of the present invention. The electronic device 40 comprises a first function module 41, for performing a first task; and a second function module 42, coupled to the first function module, for performing a second task. The first function module determines whether the resources of the system are exhausted according to completion counts of the first task and the second task. As mentioned above, a correlation exists between the first task and the second task, and it is determined whether the resources of the system comprising the electronic device 40 are exhausted according to the completion counts of the first task and the second task. Taking a satellite positioning device as an example, since the satellite positioning device comprises a measurement engine for detecting a parameter of a satellite signal every 0.1 second, and a position engine for calculating a position and a speed of the satellite positioning device every one second, the measurement engine is defined as the first function module 41, and the position engine is defined as the second function module 42. The function of monitoring the resources of the system comprising the electronic device 40 is achieved by applying the foregoing method for monitoring the resources of the system, and detailed description thereof shall not be described for brevity. Likewise, the electronic device 40 may also comprise more function modules in a serial or parallel connection to achieve an object of monitoring one another.

Figure 6:
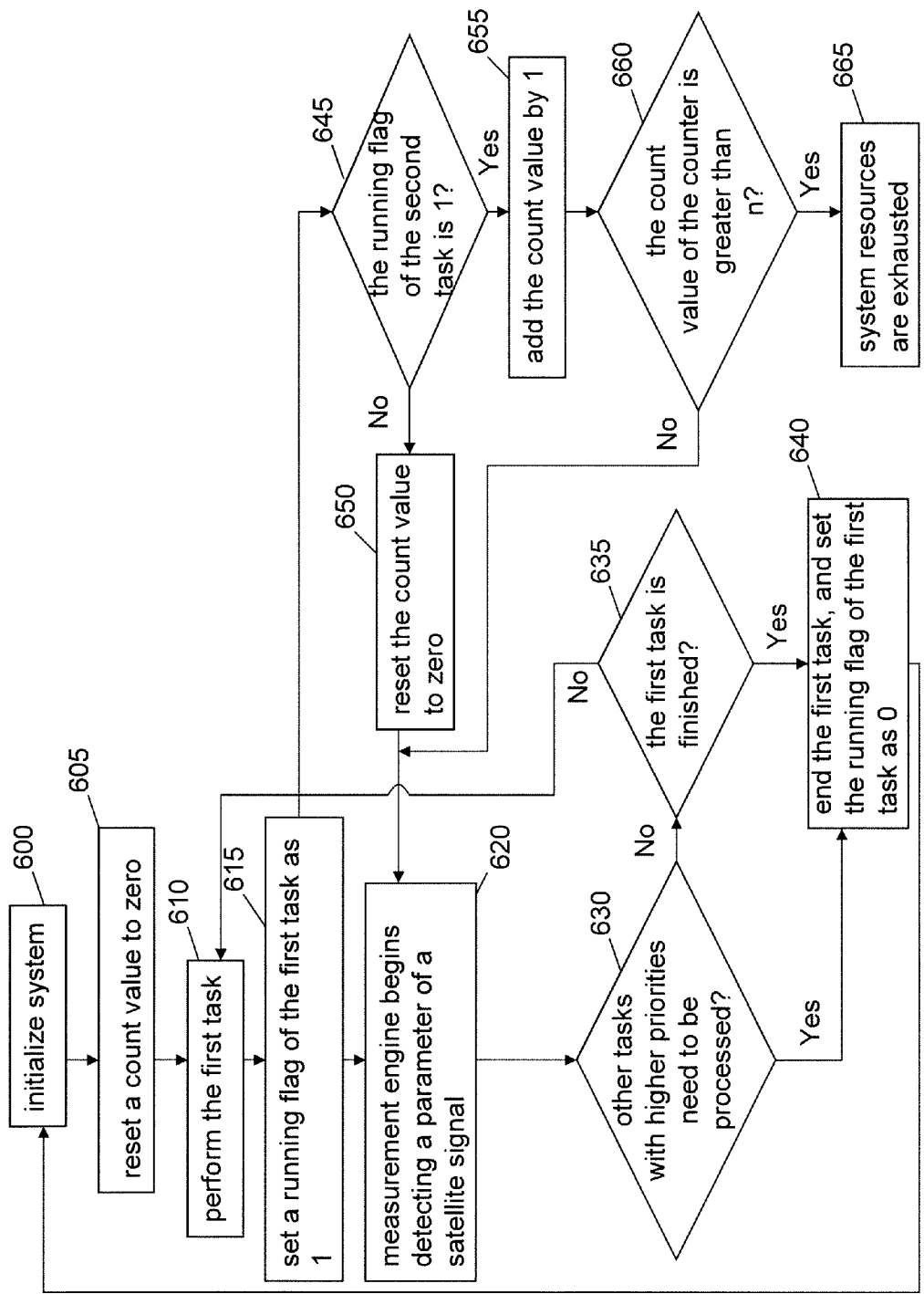
FIG. 6 is a flow chart of a first task and a satellite positioning system determining whether resources are exhausted.
Figure 7:
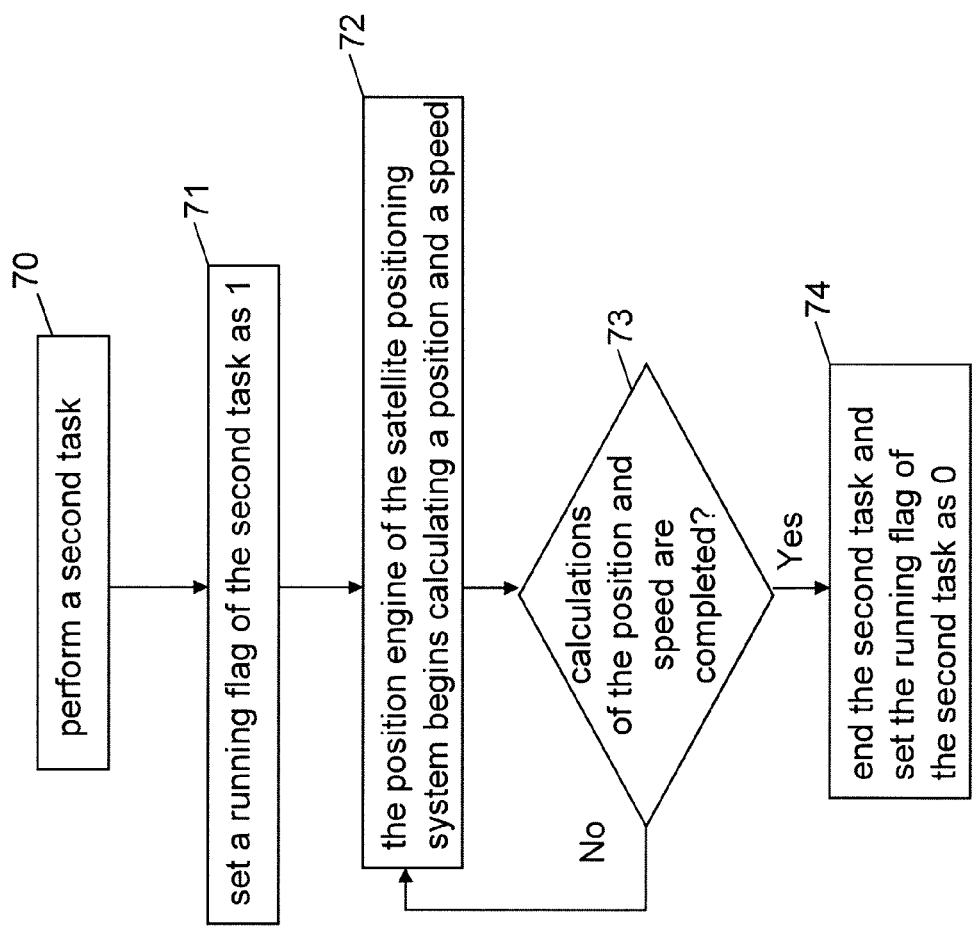
FIG. 7 is a flow chart of a second task.

FIG. 6 and FIG. 7 show flow charts of a method for monitoring resources of a satellite positioning device in accordance with an embodiment of the present invention. FIG. 6 is a flow chart of a first task and the satellite positioning system determining whether the resources are exhausted, and FIG. 7 is a flow chart of a second task. The satellite positioning system comprises more than two tasks to be performed, with a task of a measurement engine being the first task and a task of a position engine being the second task are taken as an example. Other engines, e.g., a timer engine and an acquisition engine, can be accordingly analyzed. In addition, in the flow charts, a first predetermined value n and a second predetermine value 1 are also taken as an example. Referring to FIG. 7, the flow is described below.

In Step 70, the satellite positioning system begins performing the second task. In Step 71, the satellite positioning system defines a running flag of the second task as 1. In Step 72, the position engine of the satellite positioning system begins calculating a position and a speed. In Step 73, it is determined whether calculations of the position and speed are completed. When the answer of Step 73 is positive, Step 74 in which the second task ends and the running flag of the second task is defined as 0 is performed; otherwise, the flow returns to Step 72. Referring now to FIG. 6, the flow is described below.

In Step 600, the satellite positioning system is initialized. In Step 605, a counter is reset to return a count value to zero. In Step 610, the satellite positioning system begins performing the first task. In Step 615, the satellite positioning system defines a running flag of the first task as 1. Following Step 615, Step 620 in which the measurement engine begins detecting a parameter of a satellite signal, and Step 645 in which it is determined whether the running flag of the second task is 1, are respectively performed. In Step 630, it is determined whether other tasks with higher priorities need to be processed in the satellite positioning system. When the answer of Step 630 is positive, the flow skips to Step 640; otherwise, Step 635 in which it is determined whether the first task is finished is performed. When the answer of Step 635 is positive, Step 640 is performed; otherwise, the flow returns to Step 610. In Step 640, since other tasks need to be performed or the first task is completely performed, the satellite positioning system interrupts or ends the first task, and defines the running flag of the first task as 0, and the flow returns to Step 600 to iterate the flow. In FIG. 7, when the second task is performed, the running flag of the second task is defined as 1, and the flow skips to Step 655; otherwise, when the second is not being performed or is completely performed, the running flag of the second task is defined as 0 and Step 650 is performed. In Step 650, the counter is reset to return the count value to zero, the first task is continued to be performed, and the flow returns to Step 620. In Step 655, when the first task is performed once, the count value of the counter increments by 1, and Step 660 in which it is determined whether the count value of the counter is greater than n is performed. Note that the first predetermined value is n and the second predetermined value is 1 in the flow chart are taken as an example. Therefore, when the count value of the counter is greater than n, it means that the first task is performed n times and the second task is still being performed (i.e., the running flag of the second task is 1), i.e., the second task is not performed once yet, and Step 665 in which the resources of the system are determined as being exhausted is performed. When the count value of the counter is not greater than n, it means that a completion count of the first task does not achieve the first predetermined value n, and so the flow returns to Step 620.

It is to be noted that, in the foregoing embodiments, the first predetermined value n and the second predetermined value 1 are described for illustration purposes; however, the predetermined values are not limited to the foregoing numbers. Other number proportions extended from modifications by a person having ordinary skills in the art according to a technology principle disclosed by the present invention are within the scope and spirit of the present invention.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for monitoring resources of a system in an electronic device for performing a first task and a second task, comprising:
    calculating, in the electronic device, a first completion count of the first task;
    calculating, in the electronic device, a second completion count of the second task, wherein the first completion count and the second completion count are the performed times of the first task and the second task, respectively;
    providing, in the electronic device, a correlation which is a ratio of the number of the first completion count of the first task to the second completion count of the second task; and
    determining, in the electronic device, whether the resources are exhausted according to the first completion count, the second completion count and the correlation,
    wherein when the first completion count achieves a first predetermined value, but the second completion count fails to achieve a second predetermined value during a same predetermined time, determining that the resources are exhausted.

2. The method as claimed in claim 1, wherein the first predetermined value is greater than or equal to the second predetermined value.

3. The method as claimed in claim 2, wherein the second predetermined value is 1.

4. The method as claimed in claim 1, wherein a priority of the first task is higher than that of the second task.

5. The method as claimed in claim 1, further comprising:
    performing a third task, and
    determining whether the resources of the system are exhausted according to relative completion counts of the second task and the third task, wherein a priority of the first task is higher than that of the second task, and the priority of the second task is higher than that of the third task.

6. The method as claimed in claim 1, wherein the system is a system comprising a satellite positioning device.

7. A method for monitoring resources of a system in an electronic device for performing a first task and a second task, comprising:
    calculating, in the electronic device, a first completion count of the first task during a predetermined period;
    calculating, in the electronic device, a second completion count of the second task during the predetermined period, wherein the first completion count of the first task and the second completion count of the second task are the performed times of the first task and the second task, respectively; and
    determining, in the electronic device, whether the resources are exhausted according to the first completion count and the second completion count,
    wherein when the first completion count achieves a first predetermined value, but the second completion count fails to achieve a second predetermined value during a same predetermined time, determining that the resources of the system are exhausted.

8. The method as claimed in claim 7, wherein the first predetermined value is greater than or equal to the second predetermined value.

9. The method as claimed in claim 7, wherein a priority of the first task is higher than that of the second task.

10. The method as claimed in claim 7, further comprising:
    performing a third task,
    calculating a third completion count of the third task during the predetermined period, and
    determining whether the resources of the system are exhausted according to a proportion relationship between the second completion count and the third completion count, wherein a priority of the first task is higher than that of the second task, and the priority of the second task is higher than that of the third task.

11. The method as claimed in claim 7, wherein the system is a system comprising a satellite positioning device.

12. An electronic device, capable of monitoring system resources of the electronic device, comprising:
   a memory;
   a first function module executable from the memory, for performing a first task; and
   a second function module executable from the memory, coupled to the first function module, for performing a second task;
   wherein, the first function module determines whether the system resources of the electronic device are exhausted when a first completion count of the first task achieves a first predetermined value, but a second completion count of the second task fails to achieve a second predetermined value during a same predetermined time, wherein the first completion count of the first task and the second completion count of the second task are the performed times of the first task and the second task, respectively.

13. The electronic device as claimed in claim 12, wherein the first predetermined value is greater than or equal to the second predetermined value.

14. The electronic device as claimed in claim 12, wherein the electronic device is a satellite positioning device.

15. The electronic device as claimed in claim 14, wherein the first function module is a measurement engine for measuring a parameter of a satellite signal, and the second function module is a position engine for calculating a position and a speed of the satellite positioning device according to the parameter.

16. The electronic device as claimed in claim 12, wherein a priority of the first task is higher than that of the second task.

17. The electronic device as claimed in claim 12, further comprising:
   a third function module, coupled to the second function module, for performing a third task;
   wherein, the second function module determines whether the resources of the electronic device are exhausted according to relative completion counts of the second task and the third task, and a priority of the first task is higher than that of the second task, and the priority of the second task is higher than that of the third task.

* * * * *